Patented Mar. 22, 1949

2,464,833

UNITED STATES PATENT OFFICE 2,464,833

PURIFICATION OF CARBAZOLE

Wojciech Swietoslawski, Pittsburgh, Pa., assignor to Koppers Company, Pittsburgh, Pa., a corporation of Delaware No Drawing. Application August 28, 1945,
Serial No. 613,213

6 Claims. (Cl. 260—318)

The present invention relates to processes for separating carbazole from crude anthracene cake.

Crude anthracene cake obtained as a product of tar distillations comprises largely anthracene, phenanthrene and carbazole as close-boiling constituents. Considerable work has been done to devise economical processes for separating the said constituents. It is known to separate carbazole from crude anthracene cake by conversion of carbazole to an alkali metal compound thereof, for example, to potassium carbazolate, either by fusion of anthracene cake with potassium hydroxide at temperatures usually over 200° C. or by heating a solvent solution of crude anthracene cake in the presence of potassium hydroxide at temperatures of about 200° C. The resulting fused product can be vacuum distilled to separate, for example, anthracene, phenanthrene and unreacted carbazole from remaining carbazolate or in the case of a solvent solution, the insoluble potassium carbazolate can be separated from solvent solution containing said other constituents. The separated solid potassium carbazolate can thereafter be treated with steam, water* or dilute mineral acid to convert it to a carbazole product. Plant scale yields have been relatively poor, where either of the above-described processes have been employed for producing an alkali metal carbazolate.

It has now been found that, if the crude anthracene cake produced by distillation of coal tar, is reacted with an organic carrier for an inorganic metal ion, the said metal ion can be put into the carbazole to form a metal carbazolate. The organic carrier can be a phenol, such as phenol, cresol, or xylol in nature. It brings about uniform distribution throughout the crude material of the metal ion and permits reaction to form metal carbazolate on elimination of a co-produced product at a relatively low temperature.

The primary object of the present invention is to provide an improved process of extracting carbazole from crude fractions containing the same wherein a metal carbazolate is formed in the extracting operation.

A further object of the present invention is to provide an improved process of extracting carbazole from anthracene cake wherein an organic carrier for an inorganic metal ion is utilized for producing metal carbazolate in making the extraction.

Another object of the present invention is to provide an improved process for preparing metal carbazolates, and more particularly those alkali metal compounds of carbazole.

Yet another object of invention is to provide a process of extracting carbazole by which a carbazolate may be prepared at comparatively low temperatures.

The invention has for further objects such other improvements and such other operative advantages or results as may be found to obtain in the processes hereinafter described or claimed.

According to the present invention crude carbazole, such as that present in fractions containing anthracene, phenanthrene, and the like, is treated for its conversion to a metal compound thereof by heating it in direct contact with a source of a metal ion, such as an alkali, an alkaline earth or aluminum combined with an organic carrier, such as a phenolate. The metal ion in a phenolate reacts with crude carbazole and readily becomes a substituent for the imino hydrogen of carbazole, forming a corresponding metal carbazolate with the simultaneous production of a phenol.

The reaction mixture can then be distilled to drive off phenol, anthracene, phenanthrene, the metal carbazolate remaining in the still as residue. The solid, metal carbazolate can thereafter be hydrolyzed by treatment with steam, water, dilute mineral acid and preferably with co-produced or other phenol to convert the same to carbazole. The reaction for producing the metal carbazolate is as follows:

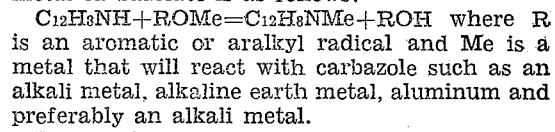

where R is an aromatic or aralkyl radical and Me is a metal that will react with carbazole such as an alkali metal, alkaline earth metal, aluminum and preferably an alkali metal.

It is preferred, because of the high yields obtainable, to prepare an alkali metal carbazolate, especially the potassium compound. To quickly effect reaction at a relatively low temperature, either one and preferably both of the reactants should be present in the reaction mixture in solvent diluents, for example, the phenolate in a corresponding phenol and the crude carbazole in a hydrocarbon solvent.

Potassium carbazolate is very easily hydrolyzed to form carbazole. It is preferred to treat the carbazolate with the phenol that is distilled off during carbazolate formation, thereby forming insoluble carbazole in a phenol solution of a reformed metal phenolate. After removing carbazole the said phenolate in phenol can be reused to separate more carbazole from its crudes or by repetition of the present process it can be used to raise the purity of a semi-refined carbazole, obtained in the first instance from a crude carbazole to a purified, refined carbazole.

Within the scope of the invention rather wide variations in reagents can be employed. Crude anthracene cake or other carbazole crudes can be dissolved in such solvents, for example, as toluene, xylene, refined coke-oven solvent naphtha, decalin and tetralin. The temperature at which the reaction is carried out is usually the boiling point of the particular phenol that is removed by distillation from the reaction mixture. Thus a solvent with an appropriately high boiling point is required. Of the possible metal phenolates it has been found that almost quantitative conversion can be quickly and easily obtained with potassium phenolates. The solid potassium phenolates can be brought into direct contact with carbazole in a solvent, or a solution of the phenolate in the corresponding phenol may be used for bringing the carbazole into reaction with the phenolate.

It is ordinarily more economical to produce potassium phenolate at a temperature below 100° C. and react it with carbazole in a homogeneous liquid phase. It has been found, however, in the case of the higher-boiling phenols, that the corresponding phenolate can be mixed with melted, crude carbazole and that an efficient reaction takes place in liquid phase without benefit of a solvent or diluent for the carbazole, or phenolate. The formed phenol is then removed by distillation or solvent extraction to precipitate the carbazolate.

The following specific example is illustrative of the results obtainable by operation of the present improvement.

*Example 1*

Twenty grams of phenol were reacted with potassium hydroxide to form potassium phenolate, the water of reaction being distilled off as a benzene-water azeotrope. To the resulting product was added a solution of carbazole in crude ethyl naphthalene (750 ml.). The resulting mixture was heated and distilled until 170 ml. of ethyl naphthalene were removed and then the solid and hot liquid phases were separated. The solid phase comprising potassium carbazolate was purified by refluxing with benzene and thereafter converting the carbazolate to carbazole by refluxing with water. The yield of about 99% pure carbazole was 34.8 grams, and overall yield of 97.9% of theory, based on the amount of phenol employed.

The hereinabove given results in the specific example illustrate some of the methods for separating a semi-refined carbazole from a crude product and then obtaining a purified, refined product therefrom. Wide variations in operating technique are possible and are empirically determinable depending largely on the physical properties of the phenolate and the solvent being employed. The process of invention can be utilized to equal advantage in those other instances where a metal ion, for example, an alkali metal, an alkaline earth metal, or aluminum can become a substituent for an imino hydrogen in a compound, as is the case with carbazole.

The subject matter of this application was originally disclosed and claimed in application having Serial Number 541,295, filed June 20, 1944, of Wojciech Swietoslawski and Thomas H. Insinger, Jr.

The preferred form of the invention having been thus described, what is claimed as new is:

1. A process for producing refined carbazole from crude carbazole containing anthracene, comprising: heating a mixture of the crude carbazole and an alkali metal phenolate to a temperature that is sufficient both to effect reaction between carbazole and the phenolate and also to vaporize from the mixture the phenol formed by the reaction to form alkali metal carbazolate; separating the anthracene from the alkali-metal carbazolate; treating the separated carbazolate with phenol to form carbazole and recovering the refined carbazole.

2. A process as claimed in claim 1 wherein the mixture of the crude carbazole and an alkali metal phenolate are reacted in the presence of a solvent diluent.

3. An improved process for producing an alkali metal carbazolate comprising: heating a mixture of carbazole and an alkali metal phenolate to a temperature that is sufficient both to effect reaction between carbazole and the phenolate and to vaporize the phenol formed during such reaction thereby forming an alkali metal carbazolate.

4. A process for separating carbazole from crudes comprising carbazole, anthracene and phenanthrene, comprising: dissolving said crudes containing carbazole in a solvent that has a higher boiling point than phenol and is immiscible with potassium carbazolate; heating the solution with potassium phenolate to reaction temperature between it and the carbazole, distilling off phenol while precipitating potassium carbazolate; separating potassium carbazolate from the solution of anthracene and phenanthrene; hydrolyzing the potassium carbazolate with a liquid hydrolyzing agent to precipitate carbazole and filtering to separate the carbazole.

5. A process for separating carbazole from a tar fraction comprising carbazole, anthracene, and phenanthrene, comprising: heating a mixture of said tar fraction and an alkali metal phenolate to a temperature that is sufficient both to effect reaction between the carbazole in said tar fraction and said phenolate and to distill off the phenol formed by their reaction; separating solid alkali metal carbazolate precipitated from the remaining liquid tar fraction; treating the separated alkali metal carbazolate with said previously separated phenol to form carbazole and alkali metal phenolate, said carbazole being precipitated; separating refined carbazole from said alkali metal phenolate; admixing said alkali metal phenolate with further quantities of said tar fraction and repeating the hereinabove described process for carbazole separation.

6. A process for producing refined carbazole from crude carbazole containing anthracene, comprising: heating a solution comprising the crude carbazole in an inert solvent and an alkali metal phenolate to a temperature that is sufficient both to effect reaction between carbazole and the phenolate and also to vaporize from the mixture phenol formed by the reaction thus to precipitate alkali metal carbazolate; separating the alkali metal carbazolate from the anthracene; hydrolyzing the separated carbazolate and recovering refined carbazole.

WOJCIECH SWIETOSLAWSKI.

REFERENCES CITED

The following references are of record in the file of this patent:

UNITED STATES PATENTS

| Number | Name | Date |
| --- | --- | --- |
| 1,404,055 | Portheim | Jan. 17, 1922 |
| 2,193,336 | Lecher et al. | Mar. 12, 1940 |